United States Patent [19]
Czarnik

[11] Patent Number: 5,496,164
[45] Date of Patent: Mar. 5, 1996

[54] IN-LINE TUBING DIE

[75] Inventor: David H. Czarnik, Twining, Mich.

[73] Assignee: The Conair Group, Inc., Pittsburgh, Pa.

[21] Appl. No.: 326,647

[22] Filed: Oct. 20, 1994

[51] Int. Cl.$^6$ .......................... B29C 47/86; B29C 47/90
[52] U.S. Cl. .................. 425/72.1; 264/209.3; 264/209.4; 425/325; 425/380; 425/467
[58] Field of Search .................................. 425/72.1, 467, 425/380, 461, 325; 264/209.4, 209.3

[56] References Cited

U.S. PATENT DOCUMENTS

| | | | |
|---|---|---|---|
| 3,146,495 | 5/1964 | Sanford | 425/380 |
| 3,841,816 | 10/1974 | Herz | 425/380 |
| 3,899,276 | 8/1975 | Sokolow | 425/380 |
| 4,021,523 | 5/1977 | Rice | 425/467 |
| 4,045,154 | 8/1977 | Ratheiser | 425/467 |
| 4,061,461 | 12/1977 | Hessenthaler | 425/467 |
| 4,323,339 | 4/1982 | de Kok et al. | 425/380 |
| 4,731,216 | 3/1988 | Topolski | 425/380 |

*Primary Examiner*—Khanh P. Nguyen
*Attorney, Agent, or Firm*—Buchanan Ingersoll; George Raynovich, Jr.

[57] ABSTRACT

An in-line tubing die for forming thin walled plastic tubing from molten plastic extrudate is provided. The hub of the tubing die is concentrically positioned within a housing and held in place by radially extending fins that join the housing to the hub. Every one of the fins that holds the hub within the housing has an air passage formed through it so that the fins are of a uniform temperature and the plastic extrudate flows uniformly around each of the fins to keep the thickness of the plastic tubing walls uniform around the entire circumference of the tubing. An annular groove or grooves are provided around the housing and are enclosed by a sheath which permits the air to circulate around the housing and be warmed to some extent before entering the passages within the fins and thereafter entering into the passage extending coaxially with the hub and into the interior of the plastic tubing.

11 Claims, 2 Drawing Sheets

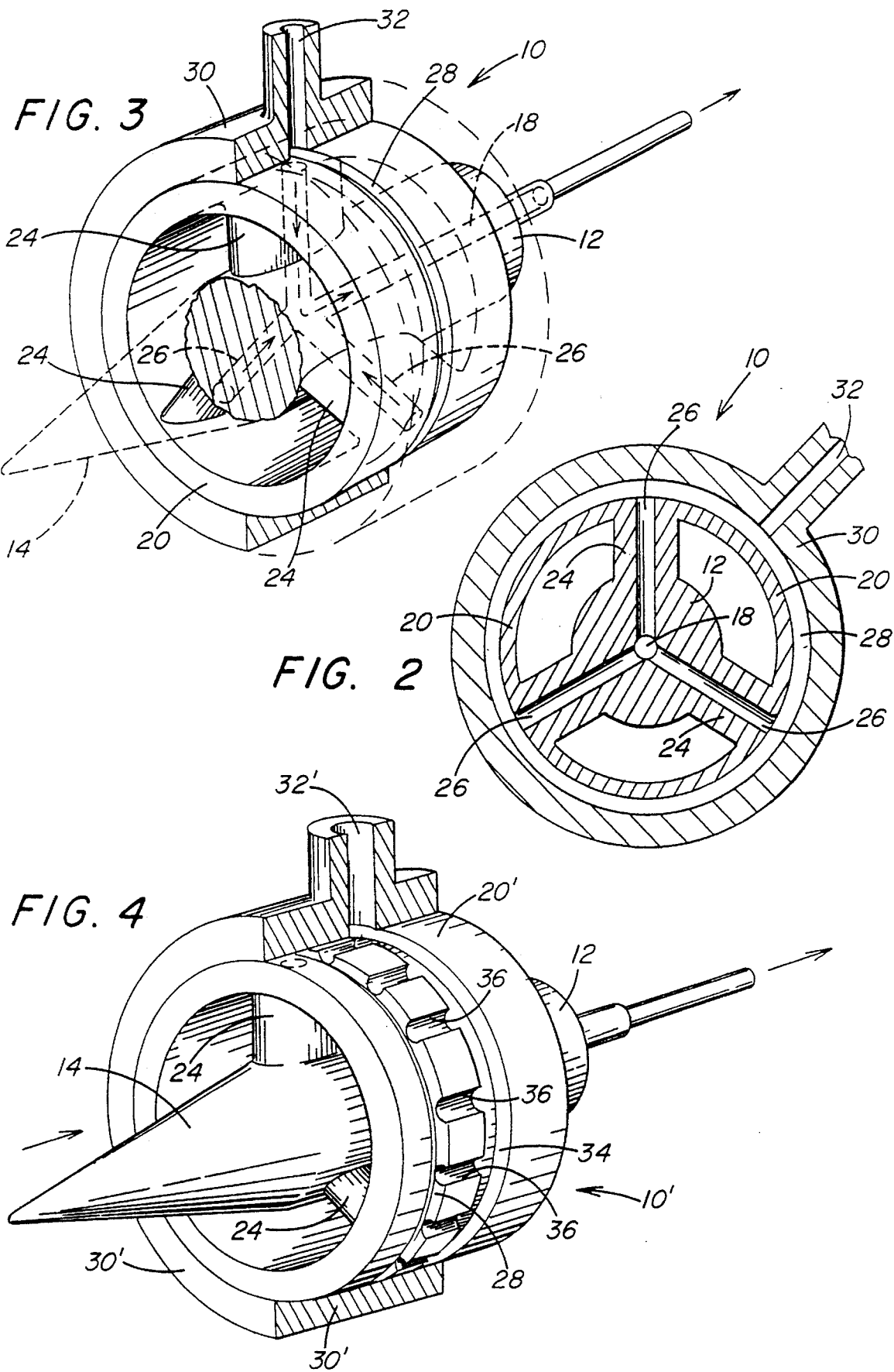

IN-LINE TUBING DIE

BACKGROUND OF THE INVENTION

1. Field of the Invention

This invention relates to tubing dies that form molten plastic extrudate into thin walled plastic tubing having uniform wall thickness about the entire circumference of the tubing.

2. Description of the Prior Art

When plastic tubing is formed by extruding plastic through a die, the hub of the die forms the inner wall of the tubing and the outer housing of the die forms the outer wall of the tubing as the extrudate passes through the in-line die. In prior art tubing dies, a single passage was provided through one of the fins holding the die hub centered in the housing. When air entered into the hub of the die and thereafter, through a passage in the die into the interior of the tubing, the air passing through only one fin cooled that fin to a temperature well below the other fins holding the hub within the housing. As the plastic extrudate passed over the hub, around the fin that was being cooled, the wall of the tubing at that point became thinner than the wall adjacent the other fins because the plastic flowed more slowly around that fin. Accordingly, the thickness of the wall of the tubing was not uniform around its entire circumference.

In an effort to correct the situation resulting from one of the fins holding the hub being cooled by air entering through that particular fin, die designers created dies that had coils surrounding the die so that the air would enter into the coil and *be circulated around the outside of the die to be heated by the higher temperature of the die. The heated air was then directed into the hub through one of the several fins that hold the hub within the housing. While this method improved the manufacture of the thin walled plastic tubing, it was not uniformly successful since it required additional costs in building the die and also required sufficient turns of the coil to cause the air entering the hub through the single fin to be heated to a temperature approaching that of the plastic extrudate.

The present invention provides an in-line tubing die in which air enters the center hub of the die through all of the fins which hold the hub in position within the housing to thereby provide for uniform walls on the thin wall tubing being formed by the die.

SUMMARY OF THE INVENTION

In accordance with the present invention, there is provided an in-line tubing die for forming extruded plastic tubing. The tubing die has a hub over which extruded plastic is passed to form the tubing. The hub has an internal air passage communicating with the interior of the tubing. An annular housing is provided that is coaxial with the hub and spaced from the hub. A plurality of radially extending fins support the hub within the housing. Air passages are formed in every one of the plurality of fins to introduce air to the internal air passage of the hub and thereby into the interior of the tubing.

Accordingly, a principal object of the present invention is to provide an in-line tubing die for forming extruded plastic tubing having uniform wall thickness throughout the circumference of the walls.

Another object of the present invention is to provide an in-line tubing die for forming extruded plastic tubing in which air entering the interior of the tubing passes through air passages in all of the fins that hold the hub of the tubing die within the housing.

Another object of the present invention is to provide an in-line tubing die in which the air entering the interior of the plastic tubing is heated to some extent by the housing of the die itself.

These and other objects of the present invention will be more completely disclosed and described as this specification proceeds in conjunction with the accompanying drawings and appended claims.

BRIEF DESCRIPTION OF THE DRAWINGS

FIG. 2 is a transverse section of the tubing die of FIG. 1 taken along line II—II of FIG. 1.

FIG. 3 is a perspective view partially in phantom lines of the tubing die of FIGS. 1 and 2.

FIG. 4 is a perspective view similar to FIG. 3 of a second embodiment of the tubing die of the present invention.

DESCRIPTION OF THE PREFERRED EMBODIMENTS

Figure 1:
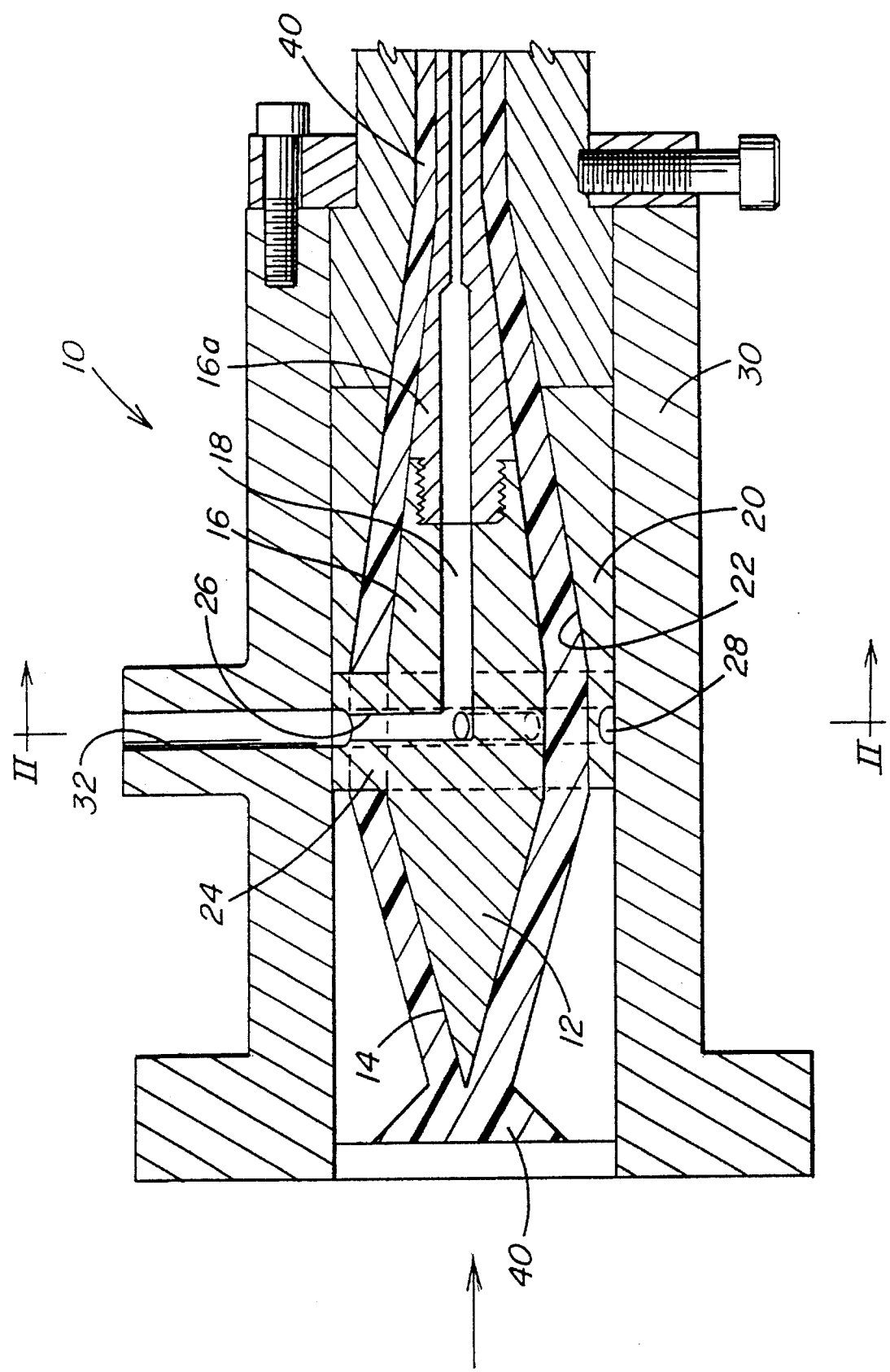
FIG. 1 is a sectional elevation of an in-line tubing die of the present invention.

Referring to the drawings and particularly to FIGS. 1, 2 and 3, there is shown an in-line tubing die 10 having a hub 12. The hub 12 has a conical entry end 14 where the plastic extrudate enters the tubing die and a tapered exit end 16. The exit end 16 may consist of more than one part as shown at 16a in FIG. 1 where the exit end 16 of hub 12 is formed of two parts threaded to each other.

An internal air passage 18 is formed within hub 12 and is coaxial with hub 12. Air entering internal air passage 18 ultimately enters into the interior of the tubing formed by the tubing die 10. An annular housing 20 is formed around the hub 12 and is coaxial with hub 12. As shown in FIG. 1, the annular housing 20 has an internal conical surface 22 which is parallel to the tapered exit end 16 of hub 12.

A plurality of radially extending fins 24 support the hub 12 within the housing 20. As shown in FIGS. 1–3, there are three fins utilized to support the hub 12 within the housing 20. It will be appreciated that there may be more or fewer fins in particular applications although for most tubing, the in-line tubing die 10 should have three fins 24 supporting the hub 12.

Each of the fins 24 has a radially extending air passage 26 formed in it. The air passages 26 communicate with the internal air passage 18 extending coaxially through hub 12. An annular groove 28 is formed in housing 20 and extends around the entire circumference of housing 20. The annular groove 28 communicates with the air passages 26 formed in every one of the fins 24. An annular sheath 30 surrounds the housing 20 and encloses groove 28. An air passage 32 formed through annular sheath 30 communicates with the annular groove 28 in housing 20 and introduces air into annular groove 28 which ultimately enters passages 26 and internal air passage 18 to introduce air to the interior of the plastic tubing being formed by the in-line tubing die 10.

Referring now to FIG. 4, there is shown a modified in-line tubing die that is preferably utilized for forming larger diameter tubing. In FIG. 4, reference numerals that are identical to the reference numerals in FIGS. 1–3 have been utilized where the part remains unchanged from the embodiment of FIGS. 1–3 and prime suffixes have been affixed to the reference numerals where the part modified from that shown in FIGS. 1–3.

In FIG. 4, the in-line tubing die 10' has a hub 12 having a conical end 14 and an internal air passage within the hub. The annular housing 20' has fins 24 that have air passages formed in every one of the fins 24.

A first annular groove 28 is formed within the annular housing 20' and communicates with the air passages formed in every one of the fins 24. A second annular groove 34 is formed in the housing 20' axially removed from groove 28. The groove 28 and the groove 34 are connected by axially extending channels 36 around the entire periphery of the housing 20'. An annular sheath 30' surrounds the housing 20' and encloses the annular grooves 28 and 34 as well as the axially extending channels 36. An air passage 32' through the sheath 30' communicates with the second annular groove 34.

In operation of the invention, molten plastic extrudate 40 (FIG. 1) enters into the tubing die 10 and is received over the hub 12 at the conical entry end 14. The extrudate passes around the fins 24 and enters between the tapered exit end 16 of hub 12 and the internal conical surface 22 of housing 20 to form the tubing which exits the tubing die. As viewed in FIGS. 1–3, air enters the air passage 32 formed in annular sheath 30 and circulates around the periphery of housing 20 within groove 28. As the air circulates around the periphery of housing 20, it is heated by the higher temperature of the in-line tubing die 10 receiving the molten extrudate 40. Air from the annular groove 28 enters into the air passages 26 formed in every one of the fins 24 and ultimately enters into the internal air passage 18 which directs the air to the interior of the tubing formed by the plastic extrudate 40. Because each of the fins 24 has an air passage 26 within the respective fins 24, the plastic extrudate 40 flowing around the hub 12 flows at a uniform rate around each of the fins thereby keeping the wall of the plastic tubing uniform. The air entering passages 26 within fins 24 is at the same temperature after having been circulated around the housing 20 in annular groove 28.

The embodiment of the invention shown in FIG. 4 operates in the same manner in which the embodiment of FIGS. 1–3 operate except that there is more prolonged exposure of the air entering air passage 32' to the hub 20' because the air from passage 32' first enters groove 34 and is circulated there and then passes through the axially extending channels 36 to groove 28 where it is again surrounds housing 20' until it enters the air passages formed within fins 24.

By providing air passages in all of the fins that hold the hub within the housing of the in-line tubing die of the present invention, the annular wall of the tubing remains at a uniform thickness around its entire circumference as opposed to having a thinner section where the cooler air enters only one fin of a three or four fin tubing die and causes a thinner section of wall at that circumferential position on the tubing.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. An in-line tubing die for forming extruded plastic tubing comprising:

a hub over which the extruded plastic is passed to form said tubing;

said hub having an internal air passage communicating with the interior of said tubing;

an annular housing coaxial with said hub and spaced from said hub;

a plurality of radially extending fins supporting said hub within said housing;

air passages formed in every one of said plurality of fins to introduce air to said internal air passage of said hub and thereby into the interior of said tubing.

2. The in-line tubing die of claim 1 wherein said annular housing has an annular sheath surrounding said housing whereby air is introduced between said housing and said sheath to thereafter enter said air passages formed in every one of said plurality of fins.

3. The in-line tubing die of claim 1 wherein the outer surface of said annular housing has an annular groove formed therein that communicates with all of the air passages formed in every one of said plurality of fins and is enclosed by an annular sheath surround said housing to thereby form an annular air passage into which air is introduced through an air inlet in said sheath.

4. The in-line tubing die of claim 1 wherein the outer surface of said annular housing has a first annular groove formed therein that communicates with all of the air passages formed in every one of said plurality of fins, a second annular groove formed therein axially removed from said first annular groove, a plurality of axial channels connecting said first annular groove and said second annular groove, said first annular groove, said second annular groove, and said axial channels being enclosed by an annular sheath surrounding said housing to thereby form two annular air passages connected by axial channels, with air being introduced through an air inlet in said sheath into said second annular groove from where it passes through said axial channels into said first annular groove and thereafter through said air passages formed in every one of said plurality of fins.

5. An in-line tubing die for forming extruded plastic tubing comprising:

a hub over which the extruded plastic is passed to form said tubing;

said hub having an internal air passage communicating with the interior of said tubing;

an annular housing coaxial with said hub and spaced from said hub;

a plurality of radially extending fins supporting said hub within said housing;

air passages formed in every one of said plurality of fins to introduce air to said internal air passage of said hub and thereby into the interior of said extruded plastic tubing;

an annular passage formed in said housing and communicating with said air passages in every one of said fins;

air conduit means communicating with said annular passage to introduce air to said annular passage so that the air entering said air passages in every one of said fins is at the same temperature.

6. The in-line tubing die of claim 5 wherein said internal air passage extends coaxially through a portion of the center of said hub.

7. The in-line tubing die of claim 5 wherein there are three radially extending fins supporting said hub within said housing.

8. An in-line tubing die for forming extruded plastic tubing comprising:

a hub over which the extruded plastic is passed to form said tubing;

said hub having an internal air passage communicating with the interior of said tubing;

an annular housing coaxial with said hub and spaced from said hub;

a plurality of radially extending fins supporting said hub within said housing;

air passages formed in every one of said plurality of fins to introduce air to said internal air passage of said hub and thereby into the interior of said extruded plastic tubing;

a first annular passage formed in said housing and communicating with said air passages in every one of said fins;

a second annular passage formed in said housing and axially removed from said first annular passage;

a plurality of channels within said housing connecting said first and second annular passages;

air conduit means communicating with said second annular passage to introduce air to said second annular passage from where it passes through said plurality of channels into said first annular passage so that air entering said air passages in every one of said fins is at the same temperature.

9. The in-line tubing die of claim 8 wherein said internal air passage extends coaxially through a portion of the center of said hub.

10. The in-line tubing die of claim 8 wherein said plurality of channels within said housing extend axially parallel to each other between said first and second annular passages.

11. The in-line tubing die of claim 8 wherein there are three radially extending fins supporting said hub within said housing.

* * * * *